Aug. 8, 1967 J. G. APFELBAUM ET AL 3,335,265

PUNCHED CARD READER

Filed Sept. 11, 1963 3 Sheets-Sheet 1

Jerome G. Apfelbaum
Robert L. Bachner
John M. Mountz
INVENTORS

BY
Leonard S. Knox
ATT'Y

Jerome G. Apfelbaum
Robert L. Bachner
John M. Mountz
INVENTORS

BY
Leonard S. Knox
Att'y

PUNCHED CARD READER

Filed Sept. 11, 1963 3 Sheets-Sheet 3

Jerome G. Apfelbaum
Robert L. Bachner
John M. Mountz
INVENTORS

BY
Leonard S. Knox
Att'y

United States Patent Office 3,335,265
Patented Aug. 8, 1967

3,335,265
PUNCHED CARD READER

Jerome G. Apfelbaum, Northbrook, and Robert L. Bachner and John M. Mountz, Niles, Ill., assignors to Solar Systems Inc., Skokie, Ill., a corporation of Illinois Filed Sept. 11, 1963, Ser. No. 308,234
7 Claims. (Cl. 235—61.11)

ABSTRACT OF THE DISCLOSURE

A reader for punched cards capable of reading an entire column of the card simultaneously and having a thickness no greater than the spacing between adjacent columns. A battery of such readers assembled in side-by-side relation can read an entire card at the same time. Light-transmitting optical elements are utilized to transmit light indicative of the presence or absence of a hole to photoelectric cells from which the composite signal is taken off in coded form. In a secondary aspect the invention comprehends circuitry and apparatus for reading the card twice to reduce the possibility of erroneous readings.

This invention relates to card readers of the type which utilize light to "read" the card, for example, a Hollerith card and which translate the reading into an electrical signal.

Such cards are employed in connection with apparatus for computing, automatic record keeping, machine tool sequencing, and other fields wherein information is embodied in the card by means of holes punched therethrough in specific locations representing a code, and the electrical signals corresponding to such information are fed into the apparatus to yield some useful result. Heretofore these punched cards have been "read" by resilient tongues positioned on one face of the card arranged to make electrical contact with a metal plate on the other face when a hole in the card permits one of the tongues to make contact with the plate. This method has demonstrated a number of disadvantages, one of which is the comparatively slow speed of reading. Consequently, the trend in the recent past is to read the card by means of photoelectric cells positioned on one side of the card, which are selectively activated by a source of light on the other side thereof. Thus when a hole permits light to pass through, a corresponding cell is activated to provide, through the medium of a suitable circuit, a signal corresponding to the position of that particular hole in the card.

One type of Hollerith card, which may be regarded as more or less standard, is rectangular and allows a total of 960 punched holes of rectangular outline arranged in 80 columns spaced 0.087" apart across the length of the card and in 12 rows spaced 0.250" apart across the width thereof, these dimensions being taken between center lines which bisect each hole in both directions. If the columns and rows are respectively regarded as two sets of intersecting co-ordinate axes, then the coded position of each hole is uniquely established by the intersection of one axis with its transverse counterpart.

Readers for cards of the foregoing specifications are available but due to the extremely close spacing of the columns, namely 0.087" (less than 3/32"), and the necessity of reading a column at a time, it has not been proposed heretofore to provide a reader capable of reading two adjacent columns concurrently. Under such circumstances, and assuming that such prior readers could be constructed of such dimensions as to encompass two alternate columns, the card then must be read once with 40 readers, then shifted one column and the remaining 40 columns read. In such case, the apparatus responsive to the output of the reader requires means for storing the first 40 readings pending the accumulation therewith of the subsequent 40 readings, the concomitant mechanical complexity for handling the card twice and the electrical and/or mechanical complexity involved in accumulating the two sets of readings. Moreover, reading time, as compared to reading the entire card in one pass, is essentially doubled.

With the foregoing in view, there has been the need for a reader to read the entire card in one setting, namely, one capable of reading the entire 960 positions simultaneously. However, those presently available are priced at approximately $20,000.00.

Where, herein, reference is made to a card of the IBM type by way of example, it will be understood that the invention is not to be understood as limited thereby. As will become apparent, the basic, single column reader in accordance with the invention is equally applicable to cards having other than rectangular holes, nor is the same to be regarded as limited in the number of rows or the number of columns availed of on the card. Furthermore, the invention reader may be used "ganged" so that a plurality of cards may be read simultaneously or any desired number less than needed for a whole card may be employed in special cases.

As the description proceeds it will become apparent that a device according to the invention is of extremely versatile character in its adaptability to cards having columns and rows which may be spaced apart regularly or irregularly and by any predetermined amount or amounts, limited only by the minimum practical thickness of an individual reader.

Additionally, the device, in its basic form, is modular and therefore one or more of a battery of readers may be replaced instantaneously, so to speak, simply by unplugging the connector between the reader and the exterior circuitry, removing the reader from the frame in which the battery is supported, inserting the replacement reader and re-engaging the connector.

Another important object is to provide a card reader utilizing photoelectric cells in multiple in which the plurality of discrete cells may be constituted from a single, small section or crystal of photosensitive material separated into independently functioning cells in order that variation of response from one cell to another is avoided as would be the case if the individual cells were to be taken from a batch, notwithstanding a tedious program of attempted matching were to be performed.

Another object is to provide a card reader employing light-transmitting elements, one individual to each possible position of a hole in a column, whereby the card is read as an input to the elements and the light emerging at the remote, output end utilized to activate individual photoelectric cells. In its principal aspect, the invention reader employs cells which are spaced much closer than the entrance ends of the elements. In such case the light-conducting elements are deformed along their respective lengths.

A further object is to provide a card reading device of L-shape having a body which comprises a first section, corresponding substantially to the foot of the L, confronting a column of holes in the card and which has a thickness no greater than the spacing of the axes upon which the holes are centered, and a second section, corresponding substantially to the leg of the L, having a thickness no greater than double the thickness of the first section. The two readers as so constituted may be reversed and juxtaposed with the second section of one of the bodies being nested in the space defined by the foot and leg of the L of the other body. By means of this nested relation, two bodies occupy the same space as if they were of the lesser of said thickness, over-all and the thicker section may be availed of to house components incapable of being carried in the thinner section.

Another object is to provide a card reader as aforesaid which comprises parts arranged for convenient assembly and disassembly whereby repair or replacement is confined to an affected part rather than involving the entire assembly.

A further object is to provide a card reader which is extremely rugged and therefore more reliable than those heretofore available.

Still another object is to provide a card reader of modular configuration and means for mounting a plurality thereof in accurate side-by-side relation, i.e., properly spaced apart and parallel, in correspondence with the holes of the card.

It will be understood also that, when reading punched card by the impingement of light transmitted through the holes upon individual photosensitive cells, it is difficult to avoid the transmission of some fraction of the rear illumination through the unpunched portions of the card —this latter not being absolutely opaque. Such transmission of light through the material of the card gives rise to spurious signals which, in this art, is termed "noise." Accordingly, cells as employed in the prior art, viz., directly confronting the card, have been operated at a threshold sufficiently high to render ineffective the effects of noise and the life of the cells was consequently reduced. By utilizing a light-conducting element having a cross-sectional area equal to, or even less than, the narrow dimension of a hole, by locating the plane of the entrance end of the light-conducting member very close to the card and by encasing these elements in a non-light-conductive, non-reflective material, the effects of noise are virtually eliminated or at least reduced far below the noise level heretofore encountered.

Other objects and advantages of the invention will become apparent from the ensuing description which, taken with the accompanying drawings, discloses a preferred form in which the principles of the invention may be embodied.

In these drawings:

FIG. 10 is a block diagram of one form of apparatus for taking two successive readings of the same card and comparing them for correspondence or disparity.

Figures 1, 2:
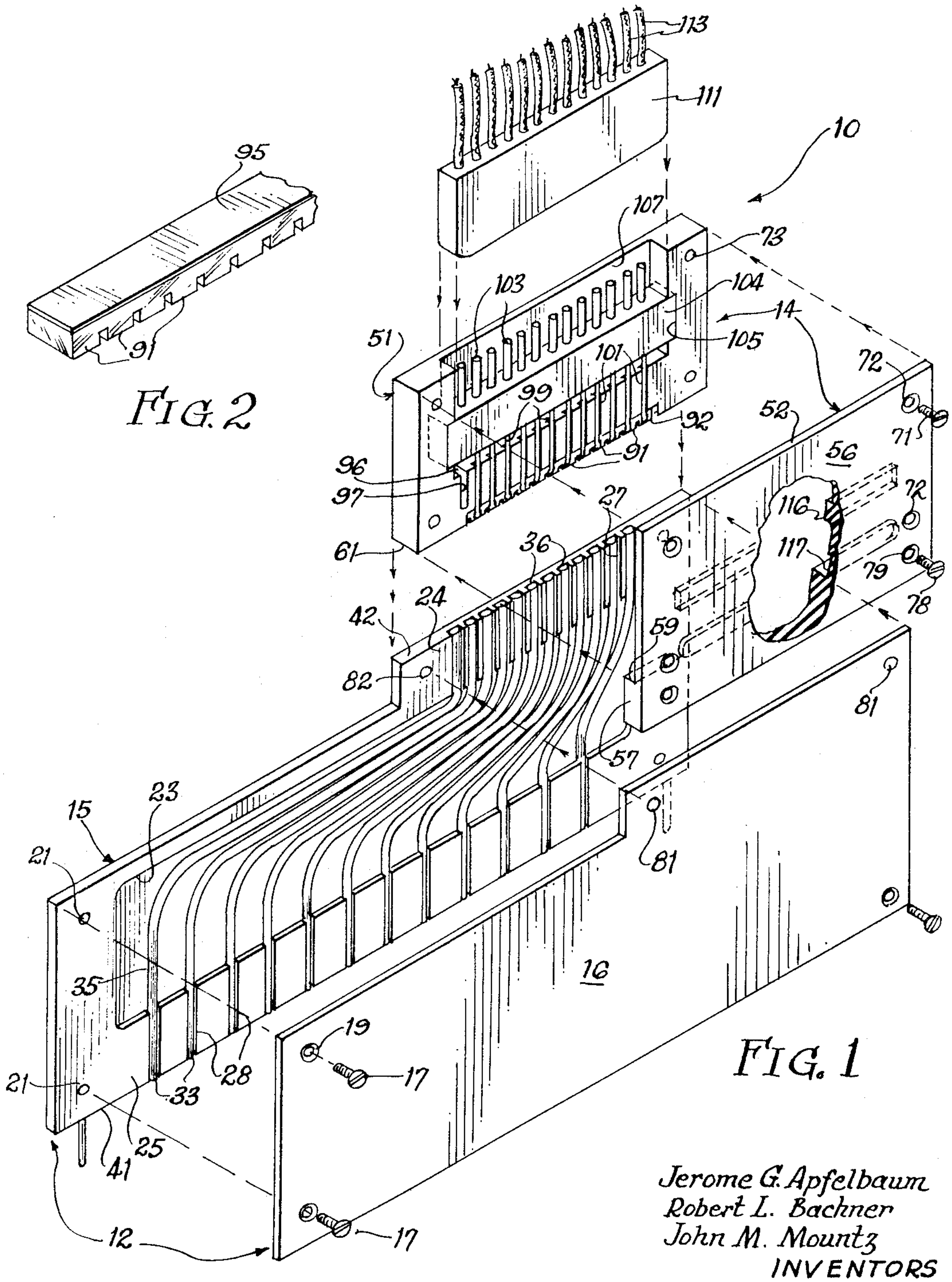
FIG. 1 is an isometric exploded view of an individual reader embodying the principles of the invention.
FIG. 2 is an isometric detail showing a group of photoelectric cells capable of use in the assembly of FIG. 1.

Where, in the description and claims, reference is made to a "reader" it is intended that a reader capable of reading one column at a time is defined; that the word "assembly" shall refer to two such readers in reversed positions and nested to be no thicker, as a pair, than the spacing between adjacent columns on the punched card, and that "battery" shall mean a group of assemblies capable of reading a whole card at one time or some smaller number of assemblies reading only a portion of a card. However, the reader may be used singly or the assemblies may be used singly, at the user's option. The words "photoelectric cell" or simply "cell" shall mean a device capable of providing an electrical current of some value in response to a predetermined level of illumination or, what amounts to the same thing, a change in current output in response to variation in the quantity of light caused to impinge thereupon. Such devices are sometimes described as "photovoltaic cells" or as "light-sensitive cells."

Broadly regarded the invention comprises a body having one face adapted to confront the card and a plurality of light-conducting elements extending from that face to a region within the body. Adjacent the inner terminations of these elements there is a plurality of photoelectric cells, one individual to each element. The entrance ends of the elements are aligned and each element is adapted to receive light transmitted through a hole in a punched card individual to that element, for example, the well-known IBM card, wherein one or more holes represent by its or their position, information in coded form. Thus, light transmitted along the elements selectively, issues at the exit end or ends to activate a cell or cells. These latter are connected into an exterior circuit for utilization of the coded information. Since the lightconducting elements are of glass, bundles of glass fibers or plastic composition, e.g., methyl methacrylate, they may be made plastic by heat and bent, or bent cold. Thus, the entrance ends thereof may have a spacing corresponding to the spacing of the holes in the card and the exit ends may have a smaller or larger spacing, depending upon the size and orientation of the cells. Preferably the body is a wafer-like unit having its greatest thickness no greater than the pitch between columns of hole positions on a punched card. At this juncture it is to be noted that a reader intended to be assembled as a battery to encompass an entire card at one reading must be capable of reading adjacent columns and that, in the case of an IBM card such columns are spaced 0.087" apart. Accordingly, it is contemplated that the edge of the reader confronting the card shall be no thicker than 0.087". Obviously, such dimension may be more or less depending upon the card to be read. Inasmuch as the IBM type of card is presently recognized as standard, the same will be referred to by way of example. Moreover, since the reader is desirably to be connected into the exterior circuit by a plug and jack and, since the smallest presently available miniature plugs and jacks are approximately $\frac{3}{32}''$ thick and, additionally, since a preferred size of cell may be on that same order in its longest dimension, the body of the reader is desirably of L-shape, the foot whereof is a thinner section no thicker than 0.087" to house the light-conducting elements, and the leg is a thicker section which is no greater than twice times 0.087", viz., 0.174", to house one half of the connector and the cells. In practice, the thickness of the thinner and thicker sections is less than 0.087" and 0.174", respectively, in order to allow for adjustment in spacing when a battery of assemblies is employed. By virtue of the L-shaped body referred to, two readers may be assembled in reversed relation, the thicker section of one reader nesting in the space defined by the leg and foot of its companion, and vice versa, so that the total thickness of this assembly is no greater than the thicker section. One section of the body, e.g., the thinner section, houses a plurality of light-conducting elements, equal in number to the number of holes to be read by the reader, e.g., a column of the card. Such elements are positioned with their respective entrance ends confronting a group of holes, e.g., a column and, in the exemplificative reader, are bent into an array such that the exit ends are closer together to be within the confines of the thicker section of the reader body, i.e., the leg of the L. The body, e.g., the thicker section thereof, houses a plurality of photoelectric cells, one individual to each light-conducting element spaced the same as the exit ends of such elements whereby light impinging on an element or elements at the entrance end thereof will activate only the cell or cells individual thereto. The entrance ends of the elements are flush or slightly below the edge of the body in order to avoid spurious response by illumination through the holes in the card. Similarly, the exit ends are desirably shielded where they confront the cells in order to avoid spurious activation of a cell or cells by an element not individual thereto. However, for the same reasons, such elements may be flush with the circumscribing portion of the body. In any case, the invention reader is adapted to be positioned with the entrance ends closely adjacent the card to preclude spurious response thereat, and closely adjacent the cells at the exit end to preclude spurious activation thereof. The cells may be individual units or constituted as a plurality of individual units formed from a single crystal with a common back which may be tinned and a common ground connected thereto, and are mounted in the body in any suitable manner. The ground and the individual positive leads of the cells are arranged to be connected into the exterior circuit, e.g., by means of a multiple plug and mating jack. The mode of connecting the cells to the exterior circuit forms no part of the invention per se, although a plug and jack is preferred since, by so doing, a defective reader may be more expeditiously replaced.

In one of its aspects, the invention provides a structure for receiving and supporting a plurality of readers in a definite spaced apart relation corresponding to the spacing between columns on the card, and in such manner as to permit rapid withdrawal of a mis-functioning reader and its replacement.

Adverting to the drawings, there is shown (FIG. 1 to 3), a reader 10 in accordance with the invention comprising a wafer-like body of L-shape consisting of a foot 12 which may, for convenience, be referred to as the thinner section, and a leg 14 which may, similarly be referred to as the thicker section.

The section 12 is of any suitable material, not necessarily of an electrically insulating character, e.g., cold-rolled steel, comprising a hollow part 15 and a cover plate 16 arranged to be secured by countersunk screws 17 passing through body holes 19 and engaged in tapped holes 21. The total thickness of the part 15 and plate 16 is no greater, e.g., 0.085″, than the spacing between columns on the card to be read, e.g., 0.087″. The part 15 has a recess 23 over a major area thereof to define, with the upper and lower edges thereof, marginal portions 24 and 25, through which like pluralities of channels 27 and 28, respectively, are provided, both sets being, in the example, 0.030″ deep by 0.062″ wide and, in the case of the channels 28, 0.0250″ on centers to correspond with the spacing of the rows on an IBM card and, in the case of the channels 27, 0.100″ on centers. It will be apprehended that the spacing of both sets of channels is variable, depending upon the spacing of the aligned holes of the card to be read and the size and spacing of the cells, respectively.

Each of the channels 28 receives the entrance end 33 of a light-transmitting element 35, and each of the channels 27 receives the exit end 36 thereof, the respective end faces being flush with the corresponding edges 41 and 42, or slightly therebelow, for the reasons stated hereinbefore. As material for the elements 35 it is preferred to use elongated substantially cylindrical bundles of fibers of optical glass arranged substantially parallel and integrated with a suitable binder, e.g., an epoxy resin. If desired, the individual fibers may be coated with a reflectant to reduce dispersion and thereby increase the efficiency of transmission, for example, a low refractive index glass coating over a higher refractive index fiber core. Also, the elements may be fused or cemented at the ends and left free to flex in between, provided that there is suitable separation between adjacent elements to preclude leakage from one to the other. Alternatively, a glass rod may be employed, or the basic material may be other than glass. In any case, the elements are softened by heat, laid in their respective channels with appropriate orientation intermediate the same, as shown in FIG. 1, and allowed to cool. A slight protrusion is allowed at both ends and, after the elements have resumed their rigid condition, the cover plate 16 is screwed down and the rough-cut ends are polished flat and flush with the edges 41 and 42.

The preferred form of the elements 35 is embraced in the field of so-called fiber optics which is based on two essential principles: one, smooth filaments or fibers of transparent materials, such as glass, conduct light with high efficiency by means of total internal reflections along the walls, and two, individual fibers in a cluster or bundle conduct this light independently of one another.

Should the elements 35 be oversize relative to the channels 27 and 28, the same may be softened with heat and, while plastic, the plate 16 may be screwed down thereby forcing the elements to assume a thickness no greater than the depth of the channels and/or the recess 23. Thus, the total thickness of the body section 15 and plate 16 may therefore be no greater than the established minimum, namely, 0.085″. Such transverse deformation of the elements 35 is without effect on their optical properties.

Superimposed on the combined part 15 and plate 16 is a thicker section, less than one-half the front-to-back dimension of the part 15, consisting of a part 51 and cover plate 52. Thus, the thinner section comprising the parts 15 and 16 and the thicker section comprising the parts 51 and 52 may be regarded as L-shaped. Parts 51 and 52 have a combined thickness less than 0.174″ (twice the pitch of the columns of the card), in this case 0.170″. The part 51 is essentially a rectangular parallelepiped and its associated cover 52 includes a thinner portion 56 coextensive therewith and a thicker portion 57 which, with the portion 56, defines a ledge 59 underlying the edge 61 of the part 51. The thickness of the portion 57 is equal to that of the section 12 for a total thickness of 0.170″. As will be clear from FIG. 3, the combined thicknesses of the section 12 of the reader plus that of the portion 57 is equal to that of the part 51 and its cover plate 52. The foregoing desiderata enable the nesting of one reader relative to a juxtaposed, reversed reader in the arrangement of FIG. 4.

Figures 3, 4, 5:
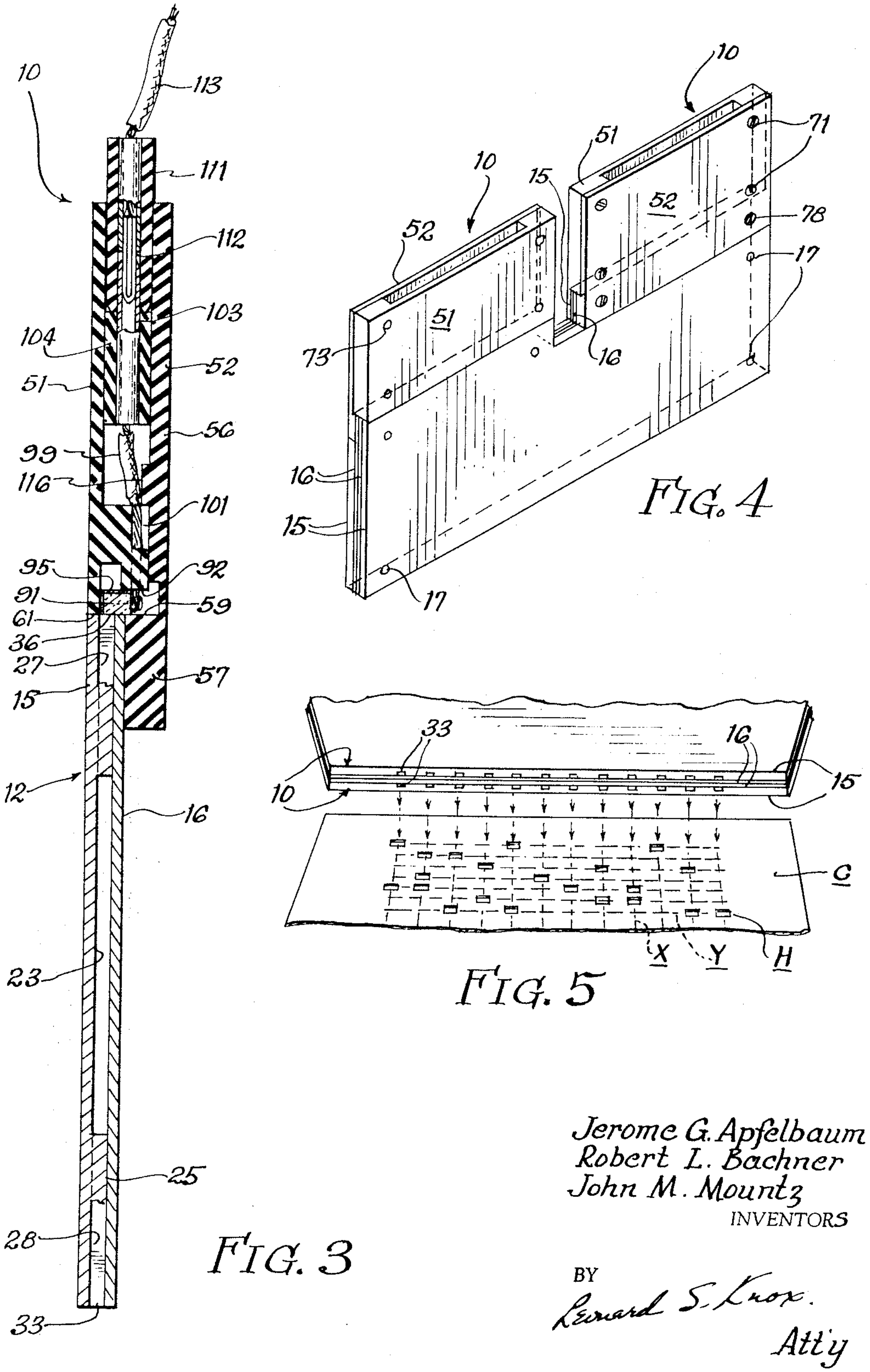
FIG. 3 is a somewhat enlarged vertical cross-section of the reader of FIG. 1.
FIG. 4 illustrates, isometrically, the nested relation occupied by two of the readers of FIG. 1; one being in the same position as in FIG. 1, and one reversed.
FIG. 5 is a detail showing two of the assemblies, as in FIG. 4, in their relation to a punched card of a common type.

The parts 51 and 52 are secured by counter-sunk screws 71 (one only shown) passing through shank holes 72 and engaged in tapped holes 73, and these two thus-united parts are carried as a sub-assembly on the section 12 by screws 78 passing through body holes 79 in the portion 57 and body holes 81 in the plate 16 and engaged in tapped holes 82 in the part 15. FIGS. 3 and 4 show the reader as thus assembled, the latter showing a pair of readers in nested relation.

FIG. 5 shows the assembly of FIG. 4 in its relation to an IBM punched card C having rectangular holes H which are 0.055″ by 0.125″ centered on column center lines Y which are 0.087″ apart, and on row center lines X which are 0.250″ apart. These center lines may, for convenience, be regarded as the ordinate and abscissa lines of a set of Cartesian co-ordinates. In this figure, the nested pair of readers are depicted in a tilted position to indicate the relationship of the entrance ends 33 of the optical elements 35 to the holes H. The position of the axis and cross-sectional dimensions of the entrance end of these elements correspond to the positions and size of the holes, namely, the intersections of a pair of a Y (column) center line with an X (row) center line. Inasmuch as the cross-section of an element 35, after deformation of the same into its channel 28, is substantially the same as that of the channel, namely, 0.030″ by 0.062″, it will be seen that the effective area of entrance of light to the element lies within the area of a hole which, in the example, is 0.055" by 0.125", thereby assuring, by such homologous relation, that the illumination through a hole is utilized to a maximum extent, and noise substantially reduced.

In the example, based on the IBM card, there are twelve rows X and therefore, twelve elements 35 in each reader.

A plurality of twelve photoelectric cells 91 is received in a recess 92 in the part 51, the photo-sensitive surface of each cell confronting the exit end 36 of individual ones of the elements 35 (FIG. 3). These cells (FIG. 2) may be of any suitable type, e.g., silicon cells which comprise N-type silicon doped with a P-type diffused boron layer on the active face and a tinned back contact. Individual cells may be used but a preferred form is to groove a single crystal to a depth just below the P-type layer whereby a plurality of individually-functioning cells have a common back with a positive lead alloyed to each cell of the group. FIG. 2 shows a group of this sort. By utilizing a single crystal for a group of cells it is a much simpler matter to obtain cells which are matched in performance as contrasted with the problem of matching individual cells taken at random from a production lot. Moreover, the arrangement of the cells in closely spaced adjacency, i.e., 0.100" on centers, enables the use of smaller crystals which will have practically uniform response over such relatively short length. Those skilled in this art will recognize the difficulties encountered in producing cells of the type here involved which are well matched for performance as members of a group functioning in the same environment.

FIG. 2 shows the tinned backing at 95 from which a common ground connection 96 passes from the recess 92, through a passage 97 (FIG. 1). The individual positive leads 99 are guided through channels 101 and are connected to individual sleeves 103 of a jack 104 retained in notches 105 in the part 51, this latter having a cavity 107 to accommodate the insulating block of the jack. The mating multiple plug 111 is provided with a plurality of prongs 112 received frictionally in associated ones of the sleeves 103. The leads to the exterior circuit are indicated at 113.

The cells, whether individual or as a group or groups formed out of a single crystal, are desirably potted in an epoxy resin or equivalent to secure them in operative position.

In order to insure that the leads 99 are well anchored it is preferred to provide the cover plate 52 with an elongated pad 116 adapted to press lightly thereon, although any equivalent means may be employed, e.g., a potting compound, and also with an elongated recess 117 in substantial register with the cells 91 to insure that the cells proper and the terminal leads therefrom are confronted by a clear space and therefore not subject to harmful pressure.

Figure 6:
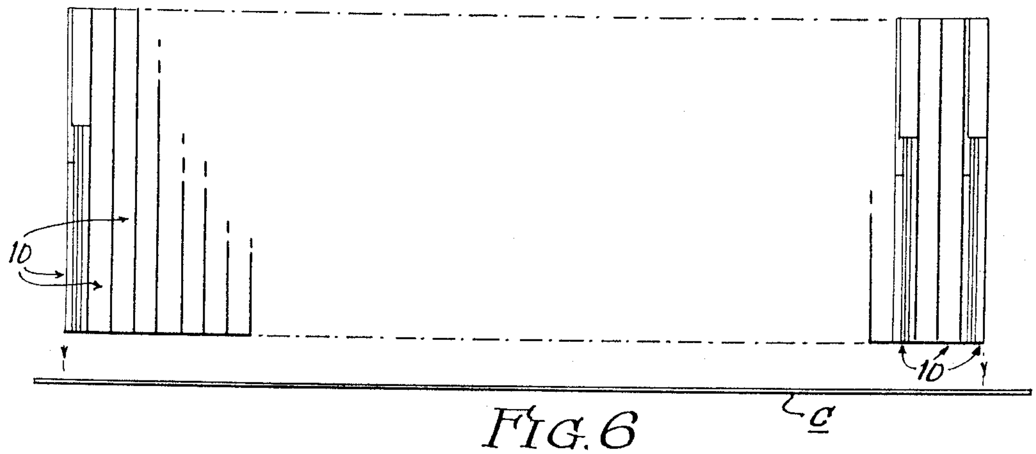
FIG. 6 is a side view of a battery of readers as shown in FIG. 4, in their relation to a punched card, the latter being displaced downwardly for clarity.
Figures 7, 8:
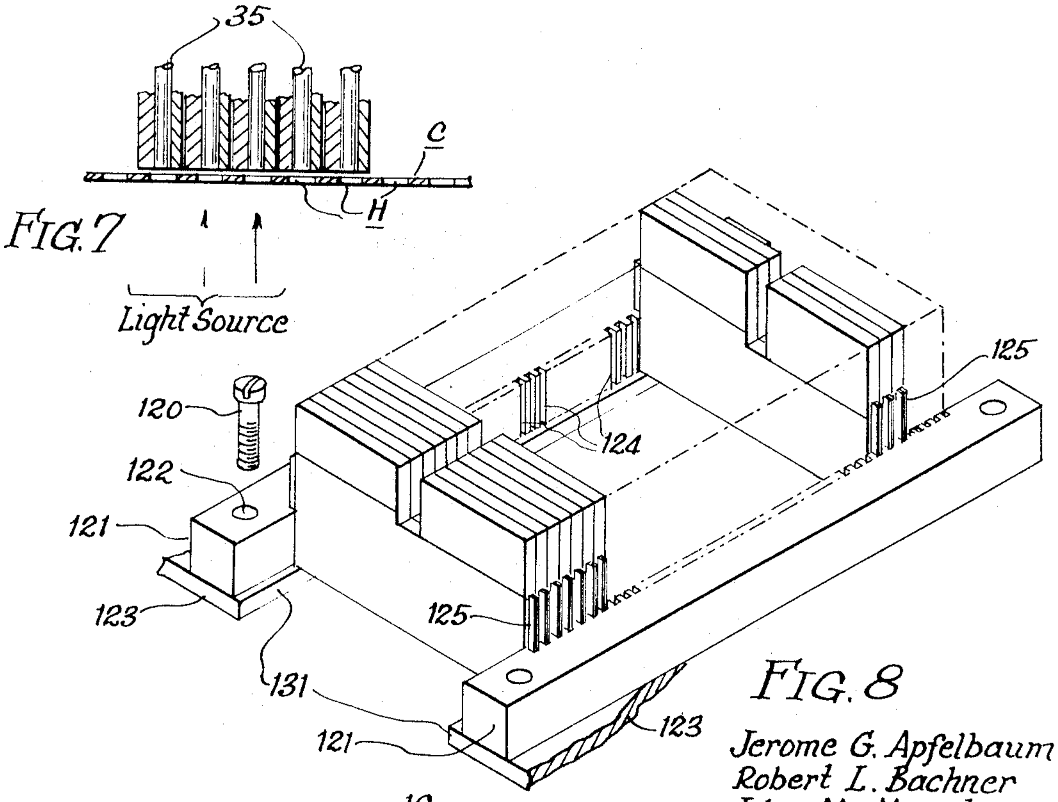
FIG. 7 is a detail, partly in section, to show the relation between the light-transmitting elements and the perforations of a card.
FIG. 8 is an isometric view of a preferred form of mounting to receive a plurality of nested assemblies as in FIG. 4.

From the foregoing description it will have become evident that light passing through the holes of the card will be conducted through the elements 35 to activate the pertinent ones of the cells 91 to provide a signal over the associated leads 113. Assuming the use of 80 readers grouped in 40 nested assemblies (FIG. 4) and the maximum number of holes in an IBM card, namely, 12 times 80, or 960, an entire card may be read at one pass (FIG. 6). It is to be noted that the card C in this figure has been displaced downwardly since in practice only minimum clearance will be allowed between the card and the coplanar bottom faces of the readers. FIG. 7 illustrates a practical clearance on an enlarged scale.

If desired, the connections between the cells 91 and the jack 104 may be arranged as a "printed" circuit.

Figure 9:
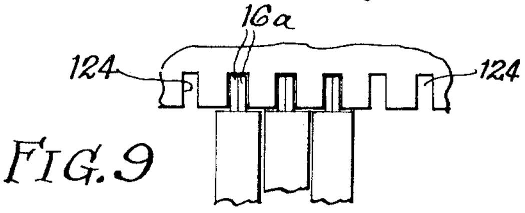
FIG. 9 is a detail of a portion of FIG. 8.

A preferred mode of mounting a battery of readers is shown in FIGS. 8 and 9, wherein there is provided a pair of spaced bars 121 having bores 122 to receive screws 120 securing the same in properly spaced relation on a suitable base 123. Each bar has a plurality of grooves 124 in transverse alignment to receive marginal portions 125 of the cover plate 16 (FIG. 1) which, in this case, are arranged to protrude slightly beyond the body part 15 in order to be adapted to the grooves 124. Inasmuch as the invention reader may be mounted otherwise than as shown exemplificatively in FIG. 8, such protrusion has not been shown in FIG. 1. For convenience of reference the cover plate, as so modified, is indicated at 16*a* in FIG. 9.

In the exemplificative reader, the cover plate 16 is 0.025" thick and, therefore, to accommodate two extended cover plates 16*a*, back-to-back, the grooves 124 are 0.053" wide, thus allowing 0.003" for commercial tolerances. This is well within the leeway of the respective registering ends of the elements 35 and holes H. As will be evident from the preceding portion of the description, the spacing of the grooves 124 will therefore be 0.174". By utilizing a slip fit between the pair of juxtaposed cover plates 16*a* and an associated pair of opposite grooves 124, replacement is made quite expeditiously since this step involves merely disconnecting the plug 111 from the jack 104, withdrawal of the defective reader, insertion of the replacement and re-engagement of the plug and jack.

In connection with FIG. 8 it will be understood that the base 123 upon which the bars 121 are mounted will underlie the bottom of the grooves 124 to limit the distance to which the readers may be inserted. If desired, the edges 131 of the base 123 may be so configured as to serve as a guide for the punched card, e.g., by means of grooves therein.

As an alternative, the number of pairs of grooves 124 may be one more than the number of columns in a card, viz., for 40 columns 41 grooves could be provided. A single reader is received in the additional pair of grooves together with a blank of the same thickness as the plate 16*a* or the tongues of an additional reader could be received in a pair of grooves only one-half as wide as the grooves 124. Thus, a card may be positioned once in proper register for reading, the readings accumulated in suitable storage apparatus, the card then shifted the pitch between columns, re-read, and the second set of readings compared with the first set in any well-known form of comparator. If lack of conformity is revealed, the card may be rejected for appropriate inspection or read a succeeding time or times by restoring the same to its first position and then forward. If comparison still indicates lack of conformity, feeding of succeeding cards may be suspended automatically or manually, pending investigation of the difficulty and appropriate rectification, or the card failing to prove out for one-to-one correspondence of the two readings may be rejected to a "reserve" receiver. In line with the alternative just described, the apparatus is so constituted as to withhold discharge of the card until the two sets of readings are found to conform and, conversely, if the readings do conform, the card is immediately discharged from the reading station.

Inasmuch as the invention reader is capable of reading columns or rows, as desired, it will be understood that any reference in this specification to the reading of holes in a column, is to be taken as equally applicable to the reading of a row, unless the context clearly indicates a contrary intention.

Furthermore, where reference is made to rows and columns based on rectangular Cartesian co-ordinates, it will be understood that the same is intended to be equally applicable to oblique Cartesian co-ordinates. In the latter case, the readers are disposed in a similar parallel array but in alignment with the columns or rows, as the case may be.

As will have become evident, the invention comprehends not only the reading of punched cards but also tape which is stepped intermittently to present one, or a specific number of rows of perforations to the reader or readers. Moreover, in special cases, the arrangement of holes may be other than rectilinear. In such instances the positions of the entrance ends of the light-conducting elements is altered accordingly.

While we have shown particular embodiments of our invention, it will be understood of course, that we do not wish to be limited thereto since many modifications may be made and we, therefore, contemplate that the appended claims cover such modifications as may fall within the true spirit and scope of our invention.

We claim:

1. A punched card reader of the class described for selectively providing electrical signals in accordance with light transmitted through coded holes of the card comprising a thin, L-shaped body having a thinner section and a thicker section of substantially twice the thickness of the thinner section, one face of both sections being co-planar, the thinner section being substantially coextensive with the foot of the L and the thicker section being substantially coextensive with the leg of the L, the areas of the respective sections having respective extents such that when one body of a pair is reversed from the position of the other and the two are juxtaposed at their non-co-planar surfaces, a nested relation is obtained, the combined thickness of the pair being no greater than the thickness of the thicker section, a plurality of light-conducting elements carried by the thinner section having entrance ends spaced apart along the outer edge of the foot of the L to confront an aligned array of holes in the card and exit ends spaced apart across the width of the leg of the L, a plurality of photoelectric cells, one individual to each element confronting the respective exit ends thereof, and circuit means to connect the cells to apparatus utilizing the output of said cells.

2. A punched card reader of the class described for selectively providing electrical signals in accordance with light transmitted through coded holes of the card, said holes being located in the card at predetermined intersections of the lines of ordinates and abscissae of a Cartesian co-ordinate system to represent information in coded form, the ordinate lines representing columns and the abscissa lines representing rows, said columns being equally spaced apart some predetermined distance, comprising a thin, L-shaped body to be positioned with the outer edge of the foot of the L adjacent the card and substantially centered on a column, the thickness of said foot being not greater than said column spacing and the thickness of the leg of the L being not greater than twice the thickness of said foot, one face of the foot being co-planar with one face of the leg, whereby two readers so constituted may be positioned with the offset faces in reversed, juxtaposed, nested relation, a plurality of elongated light-conducing elements having an entrance end and an exit end, said elements being carried in said body, there being one element individual to each intersection of a row with a column, and with the faces of the entrance ends substantially flush with the outer edge of said foot and each said element confronting a respective intersection, a plurality of photoelectric cells carried in said body, one individual to each element, the exit end of each element confronting an associated cell for selective activation of said cells in response to light transmitted through said elements when a coded column of holes is presented to said entrance ends, and circuit means to connect said cells to apparatus utilizing the output of said cells.

3. The combination in accordance with claim 2 wherein each element is a bundle of glass fibers united for function as a group.

4. The combination in accordance with claim 2 further characterized in that said exit ends are surrounded by light-opaque material to preclude dispersion of light transmitted through the elements whereby to concentrate the exiting light on the cell associated with each element and thus preclude spurius activation of the cells.

5. The combination in accordance with claim 2 further characterized in that a pair of opposite edges of the body disposed perpendicularly to the plane of the card are each provided with a tongue and there is provided a pair of spaced supports having grooves to receive said tongues.

6. A punched card reader of the class described for selectively providing electrical signals in accordance with light transmitted through a group of coded holes of the card comprising a body, a plurality of light-conducting elements mounted in said body, one individual to each member of the group, said elements having an entrance end confronting a hole position individual thereto to receive and transmit light passing through the holes and an exit end, a like plurality of photoelectric cells one individual to each said exit end to be activated selectively by light transmitted through the elements, means for connecting the cells in circuit with apparatus utilizing the output of the activated cells, said body comprising two parts, at least one of said parts having a first recess, a first plurality of channels providing communication between a face of said body opposite the punched card and said recess, said part having a second recess and a second plurality of channels providing communication between said first and second recesses, said cells being received in spaced-apart relation in said second recess and said elements each being received in said first recess and individual related ones of said channels, the entrance end of each said element being substantially flush with said body face and the exit ends thereof confronting the sensitive face of the respective associated ones of said cells, the thickness of each said part being less in the region of said first recess and greater in the region of said second recess and the widthwise extent of each said part being greater in the region of said first recess than the widthwise extent of each said part in the region of said second recess whereby the two parts may be nested for a total thickness no greater than the spacing of adjacent groups of holes of the card.

7. The combination in accordance with claim 6 further characterized in that said entrance ends are aligned and said cells are arrayed parallel thereto, the spacing of the cells being less than the spacing of the said entrance ends, said elements being variously deformed along their length between said entrance and exit ends.

References Cited

UNITED STATES PATENTS

| | | | |
|---|---|---|---|
| 2,672,288 | 3/1954 | Perrin | 235—61.11 |
| 3,188,475 | 6/1965 | Miller | 250—211 |

MAYNARD R. WILBUR, *Primary Examiner.*

A. L. NEWMAN, *Assistant Examiner.*